United States Patent [19]
Garin et al.

[11] 4,330,731
[45] May 18, 1982

[54] PARTICLE DETECTOR

[75] Inventors: Arlette Garin; Michel Rouger, both of Gif-sur-Yvette; Jean Saudinos, Paris, all of France

[73] Assignee: Commissariat a l'Energie Atomique, Paris, France

[21] Appl. No.: 135,245

[22] Filed: Mar. 31, 1980

[30] Foreign Application Priority Data

Apr. 3, 1979 [FR] France ............... 79 08327

[51] Int. Cl.³ ............................................. H01J 43/00
[52] U.S. Cl. .................................. 313/104; 313/103 R
[58] Field of Search ................. 313/95, 101, 103 R, 313/105 R, 311, 61 D

[56] References Cited
U.S. PATENT DOCUMENTS

| | | | |
|---|---|---|---|
| 3,128,406 | 4/1964 | Goetze et al. | 313/103 |
| 3,197,662 | 7/1965 | Schneeberger | 313/104 |
| 3,657,596 | 4/1972 | Goetze et al. | 313/95 |
| 4,099,079 | 7/1978 | Knapp | 313/95 |

Primary Examiner—Bruce C. Anderson
Attorney, Agent, or Firm—Pearne, Gordon, Sessions, McCoy & Granger

[57] ABSTRACT

Particle detector comprising a vacuum envelope in which there are provided a thin planar target made from a material which can emit secondary electrons when a given particle of sufficient energy strikes the target and an electron multiplier comprising a plurality of thin planar amplifying plates made from a material able to emit secondary electrons when struck by electrons with a sufficient energy, said plates being parallel to the target and spaced from one another, the secondary electrons emitted by the target and by each of the plates being accelerated by an appropriate potential difference established between the target and the closest plate and between the various plates, wherein the materials forming the target and the amplifying plates are porous.

6 Claims, 1 Drawing Figure

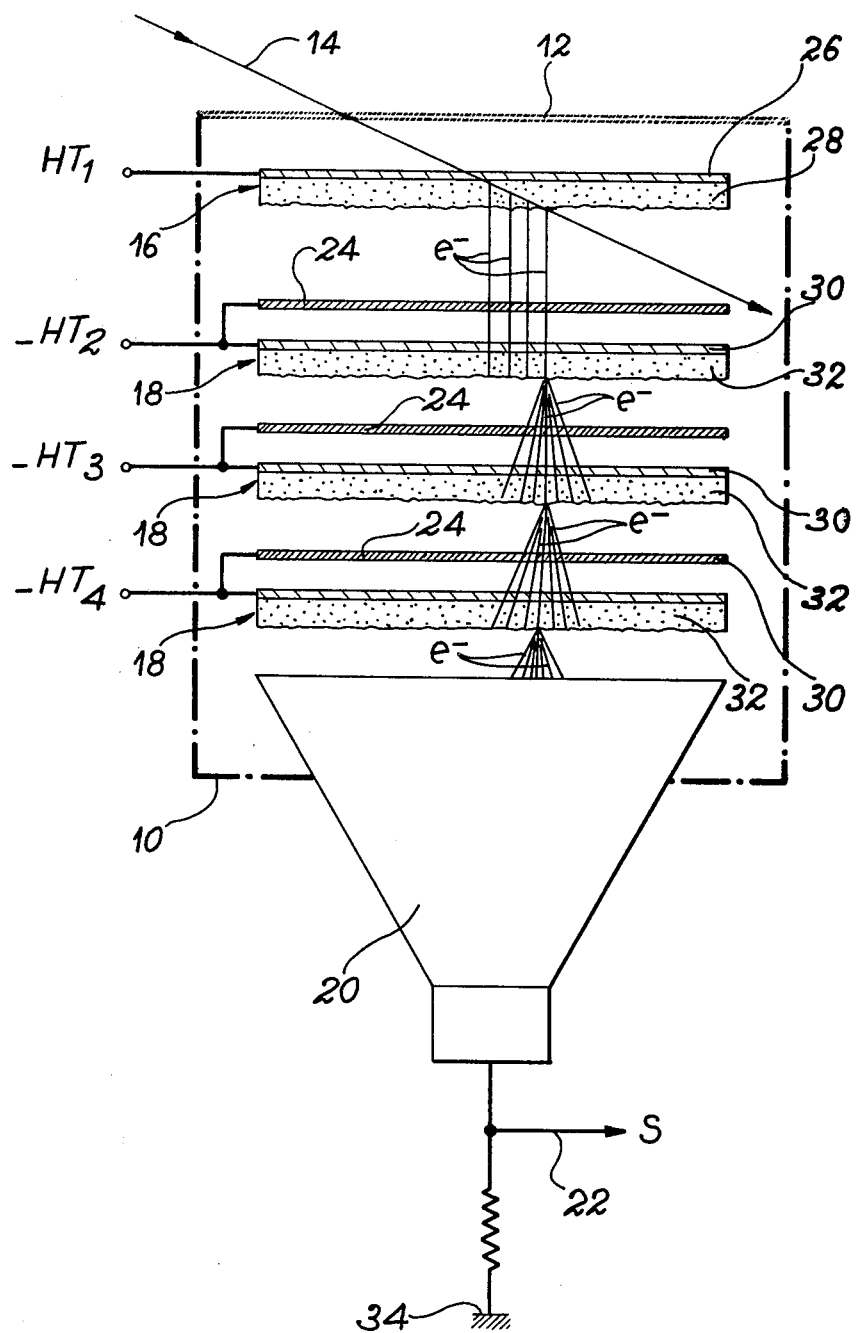

PARTICLE DETECTOR

BACKGROUND OF THE INVENTION

The invention relates to a particle detector, making it possible in particular to detect high energy particles, allowing only little ionization.

It has been proposed for the purpose of replacing existing particle detectors, which are too complex and whose response is too slow, particularly when exposed to a very intense particle bombardment such as is possible with the new generation of particle accelerators, the use of the phenomenon of secondary electron emission by a thin porous material traversed by a beam of particles has been proposed. For this purpose, a target formed by an aluminium support plate covered by a thin porous layer of a material such as potassium chloride or cesium iodide having secondary electron emission characteristics which are particularly favourable with respect to the nature of the particles to be detected or discriminated in the case of a heterogeneous beam is placed in the beam of particles. A target of this type has the double advantage of not disturbing the beam of incident particles due to the low density of the material used and of supplying a rapid response due to the absence of inertia in the emitted secondary particles. However, due to the low density of the secondary electron emission material, the number of electrons emitted when the incident particles are at their ionization minimum is very low, despite the very good efficiency of this type of target. It is therefore indispensible to amplify the signal supplied by the target, i.e. to multiply the number of secondary electrons to the greatest possible extent. In practice, studies performed up to now in this type of detector have led to the use of conventional electron multipliers comprising for example several microchannel flat coils arranged in cascade between the target and an anode and polarized in an appropriate manner to accelerate the secondary electrons emitted between each of these flat coils. However, such an amplification device is not satisfactory, because it significantly reduces the efficiency of the detector and the amplification level obtained is not strictly proportional to the number of electrons emitted by the target, in view of the fact that the signals leaving the electron multipliers are often saturated.

BRIEF SUMMARY OF THE INVENTION

The present invention relates to the construction of a particle detector by secondary electron emission making it possible to obviate the disadvantages referred to hereinbefore, whilst meeting the special requirements of particle detection occurring in homogeneous or heterogeneous high intensity beams when said particles are at ionization minimum.

The present invention therefore relates to a particle detector comprising a vacuum envelope in which there are provided a thin planar target made from a material which can emit secondary electrons when a given particle of sufficient energy strikes the target and an electron multiplier comprising a plurality of thin planar amplifying plates made from a material able to emit secondary electrons when struck by electrons with a sufficient energy, said plates being parallel to the target and spaced from one another, the secondary electrons emitted by the target and by each of the plates being accelerated by an appropriate potential difference established between the target and the closest plate and between the various plates, wherein the materials forming the target and the amplifying plates are porous.

In such a detector, the target and the plates forming the electron multiplier are made in substantially the same way from a thin plate of porous material which is able to emit secondary electrons when struck by an incident particle. Thus, the efficiency of the target is maintained by the efficiency of each of the amplifying plates and the electrons emitted by the target give rise to the creation of new secondary electrons in the first amplifying plate and so on, in such a way that the multiplication of the electrons takes place in cascade and makes it possible to obtain an amplification level which substantially is proportional to the number of electrons created by the target due to the porous nature of the target and plates which, in practice, do not stop the electrons emitted. Moreover, the detector according to the invention makes it possible to provide particle detectors with a large surface area (several hundred $cm^2$), which was not the case with the prior art detectors in which the surface area of the multipliers was generally limited to a few $cm^2$.

According to another feature of the invention, the density of the material forming the target and the density of the material forming the amplifying plates are between 1 and 10% of the normal density of these materials.

According to another feature of the invention, a shield is associated with each of the plates and is raised to the same voltage as the latter to prevent the return to the target of positive ions emitted at the same time as the secondary electrons. Preferably the target and each of the plates then comprises metallic supports on plastics material by means of which the appropriate voltage is applied thereto and the shields are also metallic. The shields and supports can, for example, be made from aluminium.

According to another feature of the invention, the material constituting the target is chosen from the alkali metal halides such as potassium chloride, magnesium oxide, cryolite, cesium iodide and lithium fluoride (particularly for the detection of neutrons). Preferably, the material constituting the amplifying plates is cesium iodide.

According to yet another feature of the invention, the target and amplifying plates are planar and are disposed within a vacuum envelope.

DESCRIPTION OF THE DRAWING AND PREFERRED EMBODIMENTS

The invention is described in greater detail hereinafter relative to a non-limitative embodiment of the invention and with reference to the attached drawing showing a particle detector constructed in accordance with the teaching of the invention.

The particle detector shown in the drawing comprises an envelope 10 in which is formed a high vacuum (approx. $10^{-6}$). Envelope 10 has a window 12 permitting the passage of an incident particle beam 14 in such a way that the latter strikes a target 16 positioned behind the window 12 under an appropriate given incidence. Behind target 16 there are several amplifying plates 18, which are parallel to one another and to target 16 and are regularly spaced so as to define an electron multiplier. The number of plates 18 is determined as a function of the desired amplification.

An anode 20 is arranged behind the final amplifying plate 18. Anode 20 is able to transmit an output signal S via a line 22 to a measuring or recording system (not shown).

Moreover, a shield 24 is positioned above each of the amplifying plates 18 in order to prevent the return to target 16 of the positive ions emitted at the same time as the secondary electrons by each of said amplifying plates 18.

Target 16 has an aluminium support on a plastics material 26 on the lower face of which is deposited a thin porous layer 28 formed from small particles of a material which emits secondary electrons when struck by given incident particles 14. Preferably, this material is chosen from among the alkali metal halides such as potassium chloride, magnesium oxide, cryolite, cesium iodide and lithium fluoride. The choice of material is dependent on the nature of the particles to be detected. Thus, for the detection of neutrons, lithium fluoride is preferably used. In the same way, the mass of the porous layer is determined beforehand so that the electron efficiency is at a maximum. Moreover, the porosity of this material is such that the mass of the porous layer placed in the beam of particles, which is below 1 milligram/cm$^2$ in no way interferes with the beam. Preferably, the density of the porous layer is between 1 and 10% of its normal density.

All the plates 18 are identical and their structure is of the same type as that of target 16. Thus, each plate 18 has an aluminium support on plastics material 30, on the lower face of which is deposited a thin porous layer 32 of a material able to emit secondary electrons when struck by incident electrons from target 16 or the preceding amplifier plate 18.

As the particles striking target 16 are not necessarily electrons, it is clear that the emitter material 28 of the target must be chosen as the function of the particles to be detected, whereas the emitter material 32 of plates 18 can be chosen independently of the nature of the incident beam. Thus, the thin porous layers 32 are generally of cesium iodide, this material being particularly suitable when the incident particles are constituted by electrons. Moreover, the mass and porosity characteristics of this material must comply with the same requirements as for target 16 and they are therefore determined in the same way.

As is clear from the drawing, in order to accelerate the secondary electrons emitted by emitter materials 28 and 32 of target 16 and amplifying plates 18 respectively, anode 20 is connected to earth at 34 and the support 30 of each of the plates 18 and support 26 of target 16 are exposed to negative voltages $-HT_4$, $-HT_3$, $-HT_2$ and $-HT_1$, which become progressively higher on moving away from anode 20. In addition, each of the shields 24 is exposed to the same negative voltage as the amplifying plate 18 with which it is associated.

The particle detector described hereinbefore with reference to the drawing functions as follows.

When an incident particle beam and particularly a high intensity beam, for example with approximately $10^{12}$ particles, strikes target 16 through window 12 made in the vacuum envelope 10, secondary electrons are emitted in known way by the thin porous layer 16 and as illustrated diagrammatically in the drawing. When the particles to be detected are particles of medium or low energy at their ionization minimum, the velocity and number of said electrons are relatively low and it is necessary to accelerate them before multiplying them. The secondary electrons emitted by target 16 are accelerated by the potential difference between the latter and the first amplifying plate in such a way that they strike the latter with an adequate energy to give rise to a further emission of secondary electrons in the thin porous layer 32 of said first plate. Thus, the secondary electron striking plate 18 is multiplied by the latter, as illustrated in the drawing. The same secondary emission phenomenon is reproduced between the different amplifying plates 18 and between the last of said plates and anode 20. The secondary electrons emitted by each of the layers 32 are accelerated by the potential difference between these plates and are then multiplied by the latter. The number of secondary electrons striking anode 20 is therefore sufficient to permit the transmission of a signal S at the output 22 of anode 20, even if the energy of the incident particle s of beam 14 is relatively low and even if the number of particles to be detected is not very high.

At the same time as the secondary electrons are emitted from each of the thin porous layers 28 and 32, respectively constituting the target 16 and amplifying plates 18 positive ions are emitted by the same layers. Due to the potential differences between these various layers, the positive ions emitted by the amplifying plates 18 tend to rise towards target 16. However, this return to the target of the positive ions emitted by the amplifying plates is prevented by shields 24, raised to the same potential as the plates 18 with which they are associated. Thus, the operation of the detector is not disturbed by the emission of positive ions at the same time as the emission of secondary electrons in plates 18. Obviously, shields 24 permit the passage of secondary electrons emitted by target 16 or by plate 18 overhanging the said shields.

Due to the absence of inertia of the secondary emission in target 16 and in each of the amplifying plates 18, the response of the detector according to the invention is particularly rapid, being equal to or below 1 picosecond. This makes it possible to obtain an efficiency which permits the use of such a detector for the detection of particles in a particularly intense beam. In addition, due to the porous nature of the different layers constituting the detector, the latter does not disturb the beam of particles. Thus, the thin porous nature of the different layers makes it possible to obtain a detection efficiency close to 100% (corresponding to the detection of a single particle). Thus, the construction of very thin support-free substrates below 70 $\mu g/cm^2$ makes it possible for very low energy electrons leaving the target to traverse the first plate prior to multiplication.

The thin porous layers are produced in vacuum envelopes which are very clean from the impurity standpoint by Joule effect evaporation under argon pressure. Moreover, the product to be evaporated previously undergoes a degasing treatment eliminating water and oxygen. In a not shown variant, there can be a plurality of interchangeable targets made from different emitter materials, the target being chosen as a function of the particle to be detected. Finally, due to the planar structure of the different layers of the detector and the parallelism of said layers, it is possible to produce detectors with a large surface area (e.g. approximately 625 cm$^2$), making it possible to obtain detectors whose efficiency is well above that of the known detectors which have multipliers whose area is generally limited to a few cm$^2$.

In a not shown and non-limitative application of a detector according to the invention, the latter is used for amplifying images in an electron microscope. In such a microscope, the object under observation is bombarded by an electron beam and the image of the surface of the object is a function of the number of secondary electrons emitted by said surface and traversing a focusing lens before being detected by a scintillator. Thus, a detector according to the invention can be arranged between the focusing lens and the scintillator in order to amplify the signal detected by the latter, notably in the case where secondary emission is too low to make it possible to accurately see the surface of the object. In an application of this type, the emitter material of the target and the amplifying plates can be the same, for example cesium iodide. The thickness of each of the thin layers is then approximately 40 $\mu g/cm^2$, the distance between the plates is approximately 1.5 mm and the high voltage is 3 kV.

What is claimed is:

1. A high energy particle detector comprising a vacuum envelope in which there are provided a thin planar target made from a material which can emit secondary electrons when a given particle of sufficient energy strikes the target and an electron multiplier comprising a plurality of thin planar amplifying plates made from a material able to emit secondary electrons when struck by electrons with a sufficient energy, said plates being parallel to the target and spaced from one another, an anode being positioned rearwardly of the amplifying plates and being located within the vacuum envelope, the anode providing the signal proportional to the secondary electrons emitted by the target, the secondary electrons emitted by the target and by each of the plates being accelerated by an appropriate potential difference established between the target and the closest plate and between the various plates, the materials forming the target and the amplifying plates being porous, a shield being associated with each of the plates, each shield being raised to the same voltage as its associated plate to prevent the return to the target of positive ions emitted at the same time as the secondary electrons.

2. A detector according to claim 1, wherein the densities of the material constituting the target and the material constituting the amplifying plates is between 1 and 10% of the normal density of these materials.

3. A detector according to claim 1 or 2, wherein the target and each of the plates have metallic supports on a plastics material by means of which the appropriate voltage is applied thereto and wherein the shields are metallic.

4. A detector according to claim 3, wherein the shields and supports are made from aluminium.

5. A detector according to claim 1, wherein the material constituting the target is chosen from among the alkali metal halides.

6. A detector according to claim 1, wherein the material constituting the amplifying plates is cesium iodide.

* * * * *